(12) United States Patent
Chuang et al.

(10) Patent No.: US 6,738,204 B1
(45) Date of Patent: May 18, 2004

(54) ARRANGEMENT OF COLOR ELEMENTS FOR A COLOR FILTER

(75) Inventors: Li-Sen Chuang, Penghu (TW); Wei-Chih Chang, Hsinchu (TW)

(73) Assignee: Toppoly Optoelectronics Corp., Chu-Nan (TW)

( * ) Notice: Subject to any disclaimer, the term of this patent is extended or adjusted under 35 U.S.C. 154(b) by 0 days.

(21) Appl. No.: 10/439,493

(22) Filed: May 16, 2003

(51) Int. Cl.[7] .................................................. G02B 5/22
(52) U.S. Cl. ...................... 359/891; 359/885; 349/109; 349/106; 345/88
(58) Field of Search ........................... 359/885, 891; 349/106–109; 345/88

(56) References Cited

U.S. PATENT DOCUMENTS 5,113,274 A * 5/1992 Takahashi et al. .......... 349/109
5,642,176 A * 6/1997 Abukawa et al. .......... 349/106
5,899,550 A * 5/1999 Masaki ....................... 349/109
6,100,861 A * 8/2000 Cohen et al. .................. 345/88

\* cited by examiner

*Primary Examiner*—Drew Dunn
*Assistant Examiner*—Leo Boutsikaris
(74) *Attorney, Agent, or Firm*—Quintero Law Office (57) ABSTRACT

An arrangement of color elements for a color filter. Each of color element groups comprises a first color element, a second color element, a third color element and a fourth color element arranged in sequence. The first color element, the second color element, and the third color element comprising three colors. The second color element and the fourth color element are identical in color and width. An active width $W_1$ of the first color element and an active width $W_2$ of the second color element satisfy the formula: $W_1 = A \times W_2$, $A = 1.7 \sim 2.3$. An active width $W_3$ of the third color element and the active width $W_2$ of the second color element satisfy the formula; $W_3 = B \times W_2$, $B = 1.7 \sim 2.3$.

20 Claims, 10 Drawing Sheets

ARRANGEMENT OF COLOR ELEMENTS FOR A COLOR FILTER

BACKGROUND OF THE INVENTION

1. Field of the Invention

The invention relates to a color filter (CF), and more particularly to an arrangement of color elements for a color filter. Specifically, the arrangement of color elements is applicable to a color filter that fulfills requests for high resolution and high aperture ratio.

2. Description of the Related Art

As scientific and information technologies have advanced, a color filter (CF) has been popularly used in video products, such as color liquid crystal displays, charge coupled devices, and scanners, to obtain color information. With regard to a liquid crystal display (LCD) with light, thin, power-saving and full color features, including super-twisted-nematic (STN), thin-film-transistor (TFT) and metal-insulator-metal (MIN) types, a color filter with three primary colors including red (R), green (G) and blue (B) elements is needed to divide a pixel into R, G, and B subpixels. The three primary colors are blended with each other in proportion to create various colors, thus enabling bright, realistic, and vivid picture quality, enhancing functionality of the LCD.

The LCD mainly constitutes a TFT array substrate, a CF substrate, and a liquid crystal layer. In a conventional CF process, thin-film color layers including R, G, and B layers are successively coated on a glass substrate to serve as R, G, and B elements, after which the R, G, and B elements must be precisely aligned to pixel areas on the TFT array substrate. In view of manufacturing costs and quality requirements, dyeing, pigment dispersion, printing and electroplating are commonly used to form the R, G and B elements of the color filter. Particularly, pigment dispersion that provides the color filter with high precision and superior light- and heat-resistance has become a major CF process. In addition, a black matrix (BM) is disposed between the R, G, and B elements, shielding TFTs on the TFT array substrate from stray light, and preventing light leakage between pixels. Recently, the BM pattern has been omitted from the CF substrate to decrease process costs, and the light-blocking area is replaced by an overlapping portion of adjacent color elements on the CF substrate.

Figure 1A:
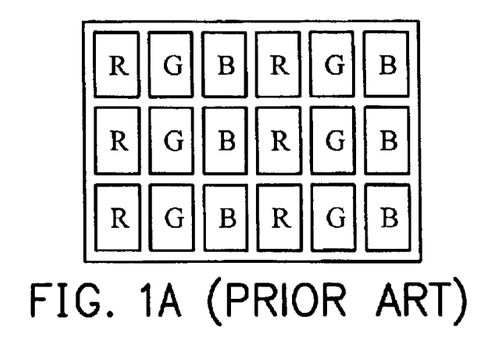
FIG. 1A is a top view of a strip-type RGB arrangement.
Figure 1B:
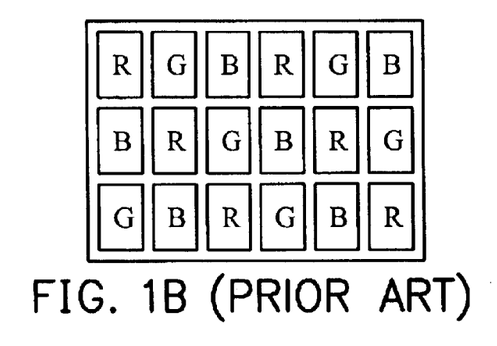
FIG. 1B is a top view of a mosaic-type RGB arrangement.
Figure 1C:
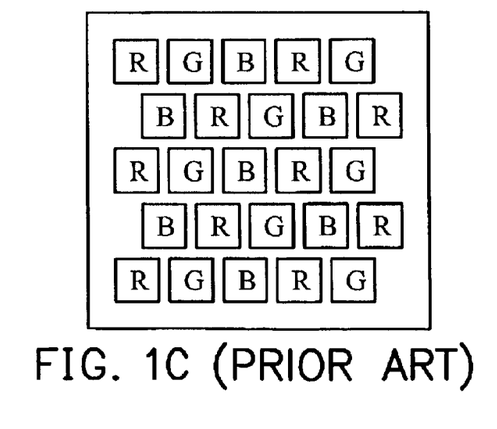
FIG. 1C is a top view of a delta-type RGB arrangement.

FIG. 1A is a top view of a strip-type RGB arrangement. FIG. 1B is a top view of a mosaic-type RGB arrangement. FIG. 1C is a top view of a delta-type RGB arrangement. The delta-type RGB arrangement provides simplified driving and optimum blend-mode effect, and is thus popularly applied to audio/video products.

Figure 2A:
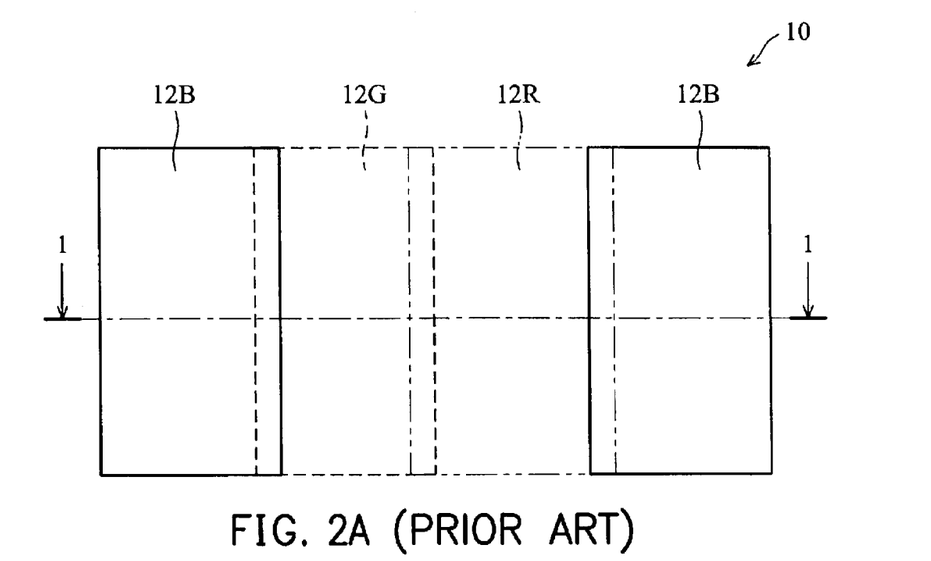
FIG. 2A is a top view of a conventional strip-type RGB arrangement with an overlapping portion between two adjacent color elements.
Figure 2B:
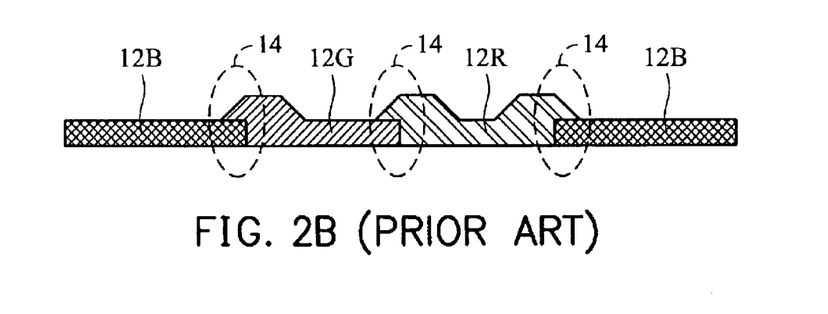
FIG. 2B is a cross-section along line 1—1 of FIG. 2A illustrating an overlapping portion of two adjacent color elements.

FIG. 2A is a top view of a conventional strip RGB arrangement type with an overlapping portion between two adjacent color elements, and FIG. 2B is a cross-section along line 1—1 of FIG. 2A illustrating an overlapping portion of two adjacent color elements. A conventional color filter 10 comprises a plurality of red elements 12R, green elements 12G and blue elements 12B in a strip RGB arrangement type. The red element 12R, green element 12G and blue element 12B have an identical width. Also, an overlapping portion 14 is formed by two adjacent color elements to serve as a light-blocking area. The overlapping portion 14, however, comprises a stack of two color coatings, and causes non-uniform distribution in pigment (or dye) thickness on a glass substrate. This protrusion damages uniformity of strength of electric fields and rotation of liquid crystal molecules within pixels, resulting in light leakage, decreased contrast ratio, poor color purity, and improperly mixed color. Moreover, with regard to a misalignment effect, the protrusion area of the overlapping portion 14 may increase, sacrificing aperture ratio, which is problematic in attaining a high-resolution LCD.

SUMMARY OF THE INVENTION

The present invention is an arrangement of color elements for a color filter. The arrangement of color elements is applicable to a color filter that fulfills requests for high resolution and high aperture ratio.

Accordingly, the present invention provides a color filter which comprises a plurality of color element groups. Each of the color element groups comprises a first color element, a second color element, a third color element and a fourth color element arranged in sequence. The first color element, the second color element, and the third color element comprising three colors. The second color element and the fourth color element are identical in color and width. An active width $W_1$ of the first color element and an active width $W_2$ of the second color element satisfy the formula: $W_1 = A \times W_2$, $A = 1.7 \sim 2.3$. An active width $W_3$ of the third color element and the active width $W_2$ of the second color element satisfy the formula: $W_3 = B \times W_2$, $B = 1.7 \sim 2.3$.

Accordingly, the present invention also provides a color filter which comprises a plurality of color element groups. Each of the color element groups comprises a first color element, a second color element, a third color element, a fourth color element and a fifth color element arranged in sequence. The first color element, the second color element, and the third color element comprising three colors. The second color element and the fourth color element are identical in color and width. The third color element and the fifth color element are identical in color and width. An active width $W_1$ of the first color element and an active width $W_2$ of the second color element satisfy the formula: $W_1 = A \times W_2$, $A = 1.7 \sim 2.3$. AN Active width $W_1$ of the first color element and an active width $W_3$ of the third color element satisfy the formula: $W_1 = B \times W_3$, $B = 1.7 \sim 2.3$.

DESCRIPTION OF THE DRAWINGS

For a better understanding of the present invention, reference is made to a detailed description to be read in conjunction with the accompanying drawings.

DETAILED DESCRIPTION OF THE INVENTION

First Embodiment

The first embodiment of the present invention provides an arrangement of color elements for a color filter, in which the color elements are in a strip-type RGB arrangement, a mosaic-type RGB arrangement or a delta-type RGB arrangement. Hereinafter, a strip-type RGB arrangement is an example with references FIGS. 3A to 3D to describe an arrangement of color elements according to the first embodiment of the present invention.

Figure 3A:
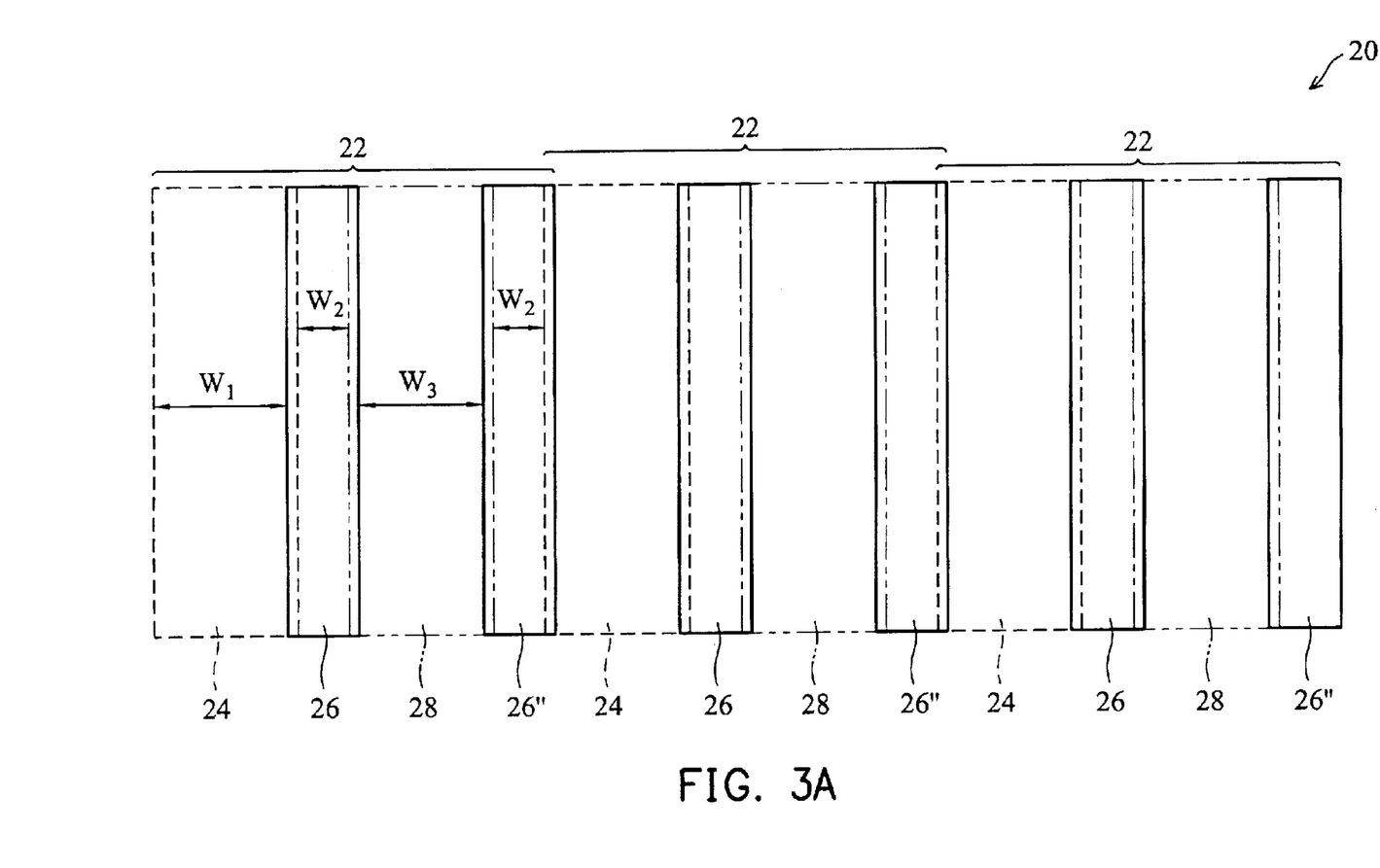
FIG. 3A is a plane view of a color filter in the first embodiment of the present invention.
Figure 3B:
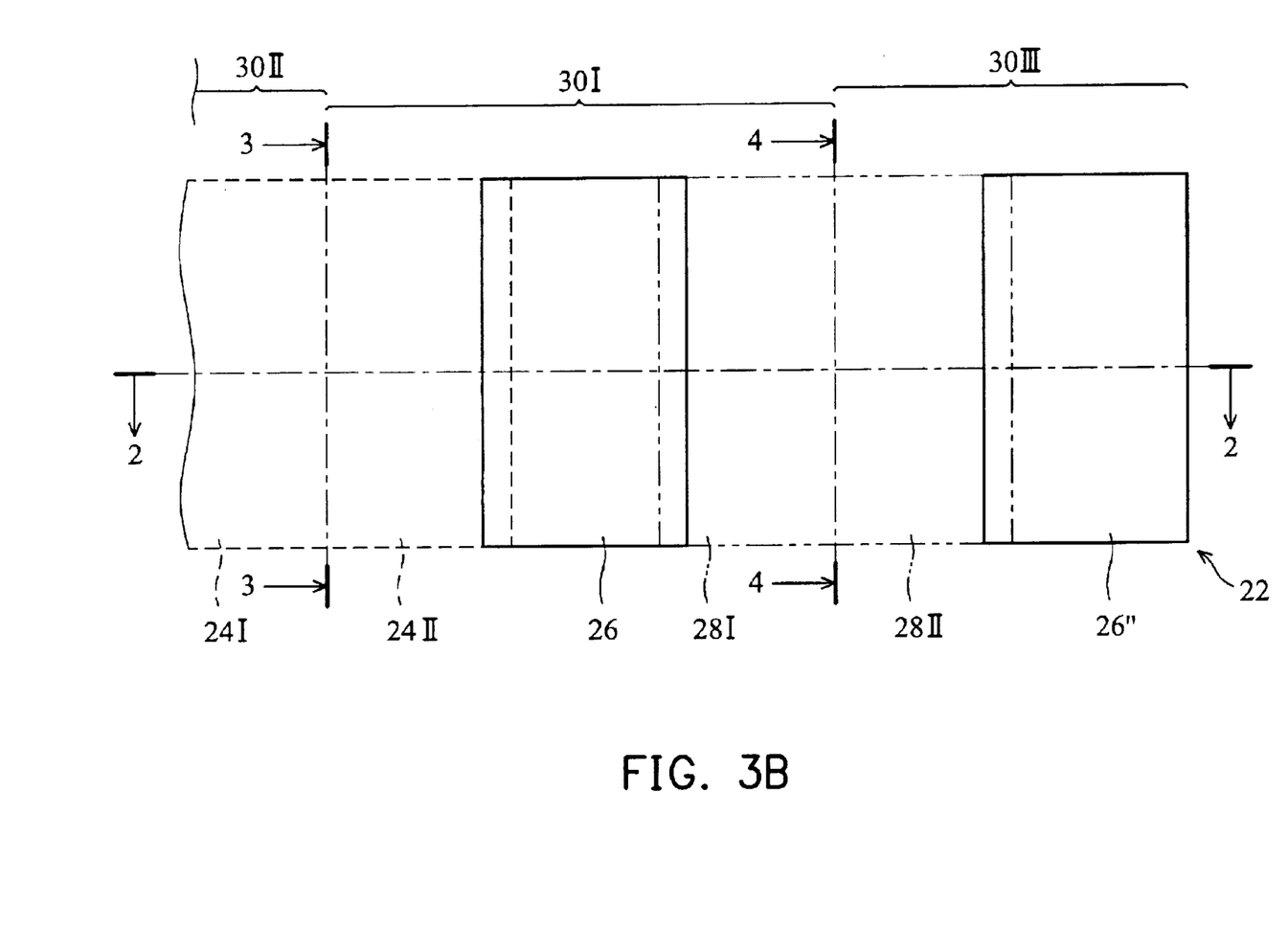
FIG. 3B is a plane view of a color element group of the color filter shown in FIG. 3A.
Figure 3C:
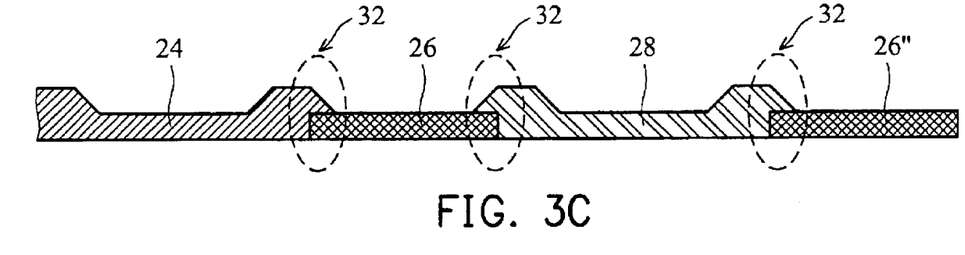
FIG. 3C is a cross-section along line 2—2 of FIG. 3B illustrating an overlapping portion of two adjacent color elements.
Figure 3D:
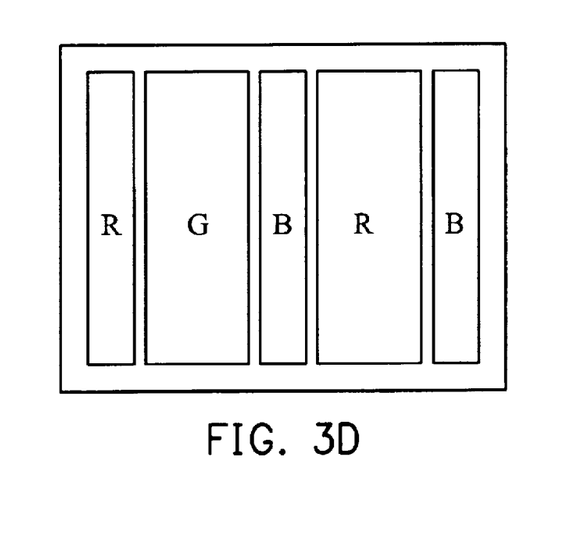
FIG. 3D is a plane view of a strip-type RGB arrangement according to the first embodiment of the present invention.

FIG. 3A is a plane view of a color filter in the first embodiment of the present invention. FIG. 3B is a plane view of a color element group of the color filter shown in FIG. 3A. FIG. 3C is a cross-section along line 2—2 of FIG. 3B illustrating an overlapping portion of two adjacent color elements. FIG. 3D is a plane view of a strip-type RGB arrangement according to the first embodiment of the present invention.

In FIG. 3A, a color filter 20 comprises a plurality of color element groups 22, and each of the color element groups 22 comprises a first color element 24, a second color element 26, a third color element 28 and a fourth color element 26" arranged in sequence. The first color element 24, the second color element 26, and the third color element 28 comprising three colors are different from each other. The second color element 26 and the fourth color element 26" are identical in color and width. An overlapping portion comprising a stack of two color coatings, is also formed at the periphery of two adjacent color elements to serve as a light-blocking area, thus the definition of an active width of each color element excludes the overlapping portion. Preferably, the active width $W_1$ of the first color element 24, the active width $W_2$ of the second color element 26, and the active width $W_3$ of the third color element 28 satisfy the formulas: $W1=A \times W_2$, wherein A=1.7~2.3, and $W_2=B \times W_3$, wherein B=1.7~2.3.

In FIG. 3B, with regard to one color element group 22, the first color element 24 comprises a left area 24I and a right area 24II according to a center line 3—3, and the third color element 28 comprises a left area 28I and a right area 28II according to a center line 4—4. The active width $W_1$ of the first color element 24 is approximately twice the active width $W_2$ of the second color element 26, and the active width $W_3$ of the third color element 28 is approximately twice the active width $W_2$ of the second color element 26, thus the right area 24II of the first color element 24, the second color element 26, and the left area 28I of the third color element 28 provide a first pixel 30I with three sub-pixels of three colors and an identical size. The left area 24I of the first color element 24 serves as a sub-pixel of a second pixel 30II left adjacent to the first pixel 30I. The right area 28II of the third color element 28 and the fourth color element 26" serves as two sub-pixels of a third pixel 30III right adjacent to the first pixel 30I.

In FIG. 3C, an overlapping portion 32, comprising a stack of two color coatings, is formed at the periphery of two adjacent color elements to serve as a light-blocking area. The present invention increases the active width $W_1$ of the first color element 24 to provide the left area 24I as one sub-pixel of the second pixel 30II and provide the right area 24II as one sub-pixel of the first pixel 30I, thus the boundary between the first pixel 30I and the second pixel 30II is a plane, not a protrusion caused by the overlapping portion 32. Similarly, the present invention increases the active width $W_3$ of the third color element 28 to provide the left area 28I as one sub-pixel of the first pixel 30I and provide the right area 28II as one sub-pixel of the third pixel 30III, thus the boundary between the first pixel 30I and the third pixel 30III is a plane, not a protrusion caused by the overlapping portion 32. Accordingly, the present invention decreases the amount and size of the overlapping portions 32 on the color filter 20 and avoids non-uniform distribution in pigment (or dye) thickness on a glass substrate and prevents damages to uniformity of strength of electric fields and rotation of liquid crystal molecules within pixels. This solves problems of light leakage, decreased contrast ratio, poor color purity, and improperly mixed color caused by the conventional art. Moreover, this effectively decreases the protrusion area of the overlapping portion 32 improving aperture ratio. Specifically, the arrangement of color elements 24, 26, 28 and 26" is applicable to a color filter that fulfills requests for high resolution and high aperture ratio.

Figure 4A:
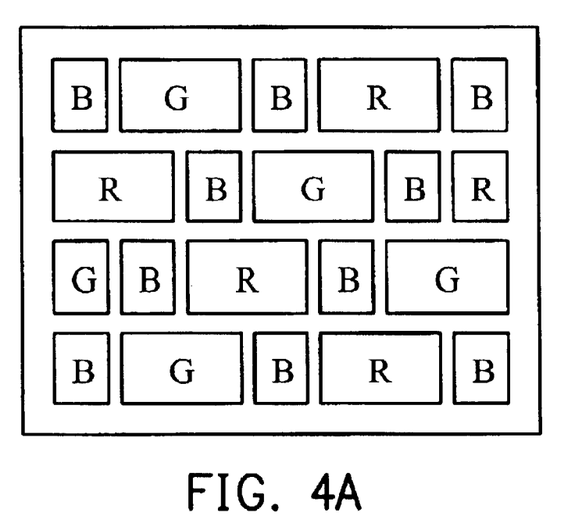
FIG. 4A is a plane view of a mosaic-type RGB arrangement according to the first embodiment of the present invention.
Figure 4B:
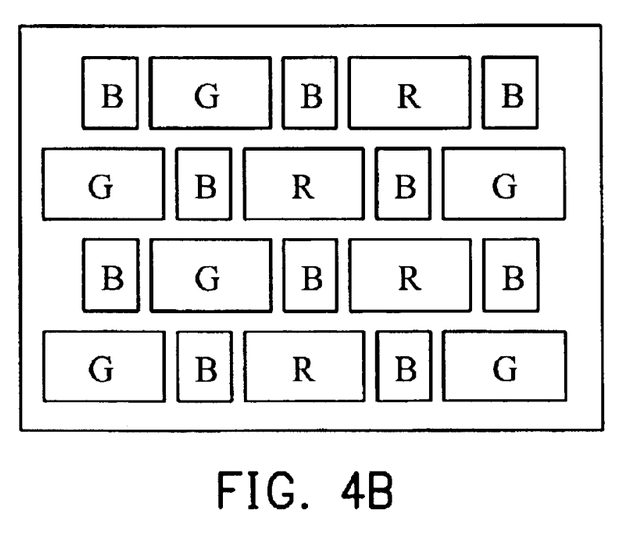
FIG. 4B is a plane view of a delta-type RGB arrangement according to the first embodiment of the present invention.

In FIG. 3D, in a strip-type RGB arrangement according to the above-described color elements 24, 26, 28 and 26", the first color element 24 is preferably a green element G, the second color element 26 is preferably a blue element B, the third color element 28 is preferably a red element R, and the fourth color element 26" is preferably a blue element B. In addition, the green element G, the red element R and the blue element B according to the above-described color elements 24, 26, 28 and 26" may be in a mosaic-type RGB arrangement as shown in FIG. 4A or a delta-type RGB arrangement as shown in FIG. 4B.

Second Embodiment

The second embodiment of the present invention provides an arrangement of color elements for a color filter, in which the color elements are in a strip-type RGB arrangement, a mosaic-type RGB arrangement or a delta-type RGB arrangement. Hereinafter, a strip-type RGB arrangement is an example with references FIGS. 5A to 5D to describe an arrangement of color elements according to the second embodiment of the present invention.

Figure 5A:
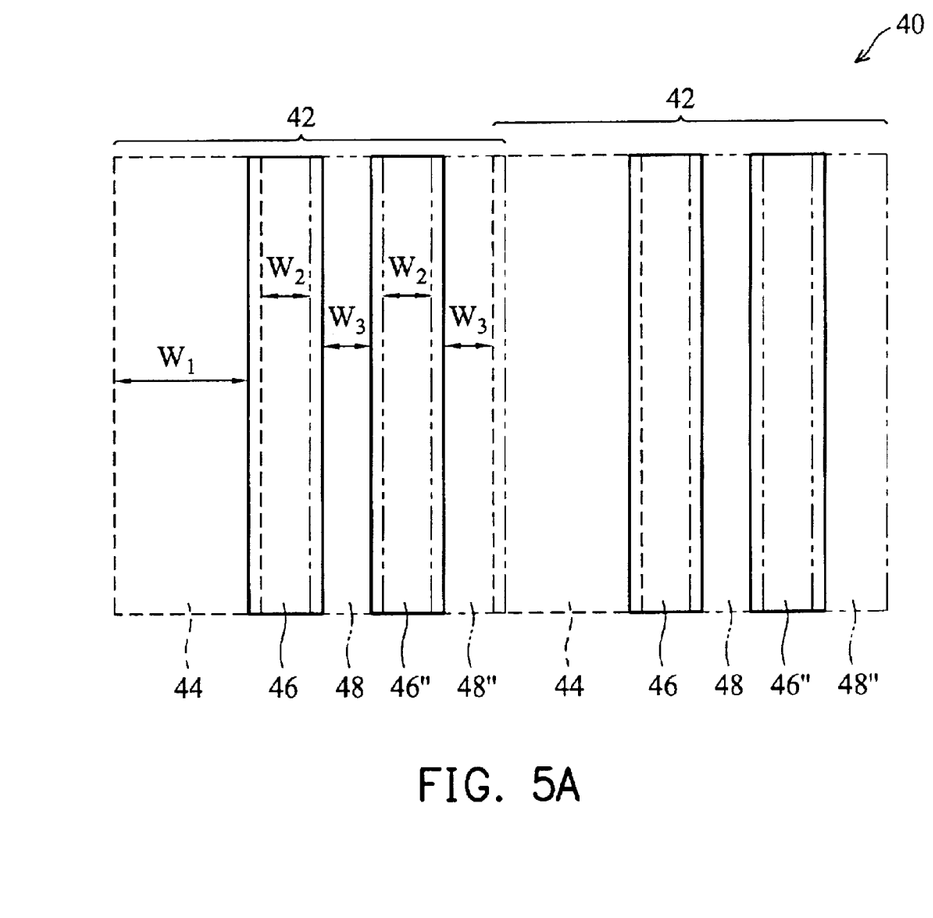
FIG. 5A is a plane view of a color filter in the second embodiment of the present invention.
Figure 5B:
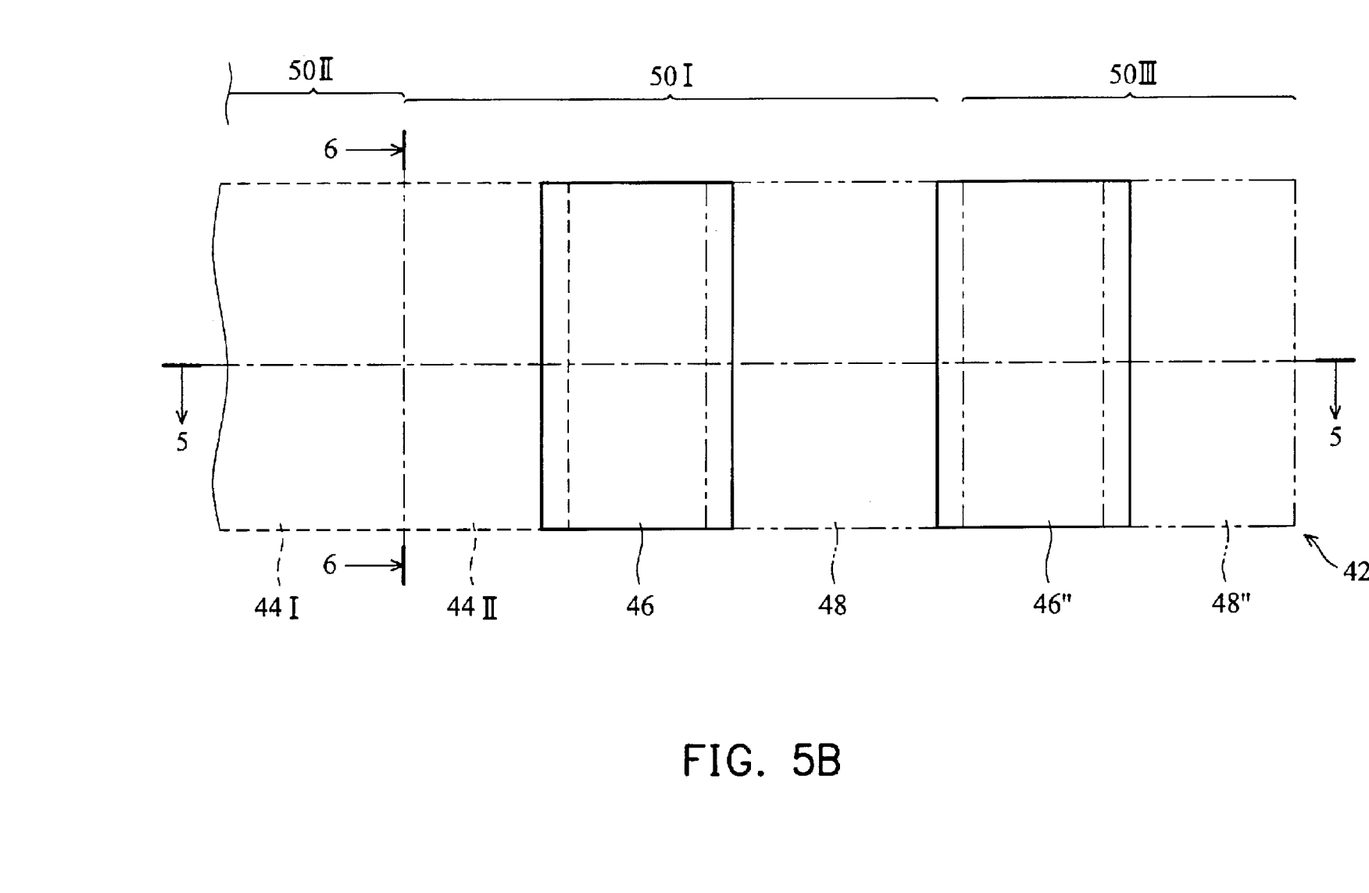
FIG. 5B is a plane view of a color element group of the color filter shown in FIG. 5A.
Figure 5C:
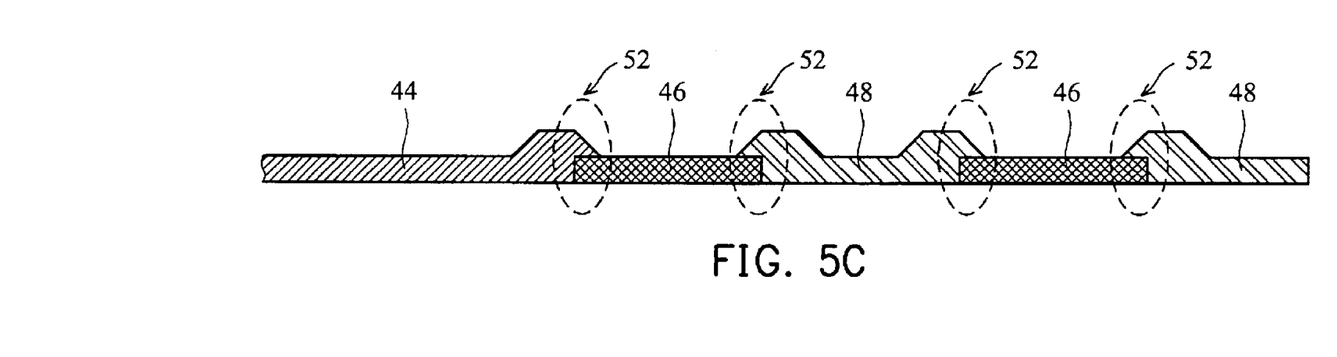
FIG. 5C is a cross-section along line 5—5 of FIG. 5B illustrating an overlapping portion of two adjacent color elements.
Figure 5D:
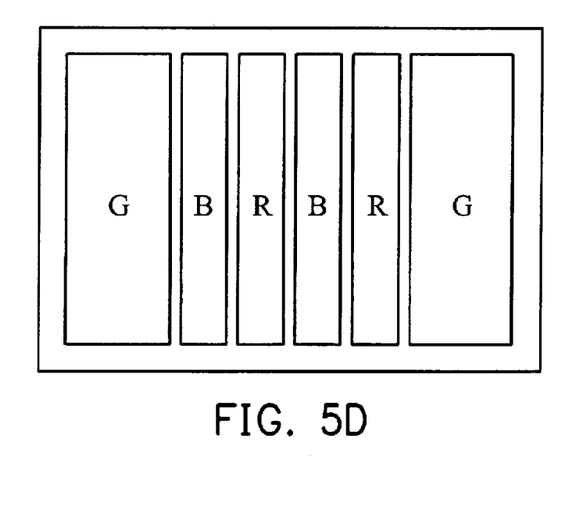
FIG. 5D is a plane view of a strip-type RGB arrangement according to the second embodiment of the present invention.

FIG. 5A is a plane view of a color filter in the second embodiment of the present invention: FIG. 5B is a plane view of a color element group of the color filter shown in FIG. 5A. FIG. 5C is a cross-section along line 5—5 of FIG. 5B illustrating an overlapping portion of two adjacent color elements. FIG. 5D is a plane view of a strip-type RGB arrangement according to the second embodiment of the present invention.

In FIG. 5A, a color filter 40 comprises a plurality of color element groups 42, and each of the color element groups 22 comprises a first color element 44, a second color element 46, a third color element 48, a fourth color element 46" and a fifth color element 48" arranged in sequence. The first color element 44, the second color element 46, and the third color element 48 comprising three colors are different from each other. The second color element 46 and the fourth color element 46" are made of an identical color and have an identical width. The third color element 48 and the fifth color element 48" are made of an identical color and have an identical width. An overlapping portion, comprising a stack of two color coatings, is formed at the periphery of two adjacent color elements to serve as a light-blocking area, thus the definition of an active width of each color element excludes the overlapping portion. Preferably, the active width $W_1$ of the first color element 44, the active width $W_2$ of the second color element 46, and the active width $W_3$ of the third color element 48 satisfy the formulas: $W_1=A \times W_2$, wherein A=1.7~2.3, and $W_1=B \times W_3$, wherein B=1.7~2.3.

In FIG. 5B, with regard to one color element group 42, the first color element 44 comprises a left area 44I and a right area 44II according to a center line 6—6. The active width $W_1$ of the first color element 44 is approximately twice the active width $W_2$ of the second color element 46, and the active width $W_1$ of the first color element 44 is approximately twice the active width $W_3$ of the third color element 48, thus the right area 44II of the first color element 44, the second color element 46, and the third color element 48 provide a first pixel 50I with three sub-pixels of three colors and an identical size. The left area 44I of the first color element 44 serves as a sub-pixel of a second pixel 50II left adjacent to the first pixel 50I. The fourth color element 46" and the fifth color element 48" serve as two sub-pixels of a third pixel 50III right adjacent to the first pixel 50I.

In FIG. 5C, an overlapping portion 52, comprising a stack of two color coatings, is formed at the periphery of two adjacent color elements to serve as a light-blocking area. The present invention increases the active width $W_1$ of the first color element 44 to provide the left area 44I as one sub-pixel of the second pixel 50II and provide the right area 44II as one sub-pixel of the first pixel 50I, thus the boundary between the first pixel 50I and the second pixel 50II is a plane, not a protrusion caused by the overlapping portion 52. Accordingly, the present invention decreases the amount and size of the overlapping portions 52 on the color filter 40 avoiding non-uniform distribution in pigment (or dye) thickness on a glass substrate and prevents damages to uniformity of strength of electric fields and rotation of liquid crystal molecules within pixels. This solves problems of light leakage, decreased contrast ratio, poor color purity, and improperly mixed color caused by the conventional art. Moreover, this effectively decreases the protrusion area of the overlapping portion 52 improving aperture ratio. Specifically, the arrangement of color elements 44, 46, 48, 46" and 48" is applicable to a color filter that fulfills requests for high resolution and high aperture ratio.

Figure 6A:
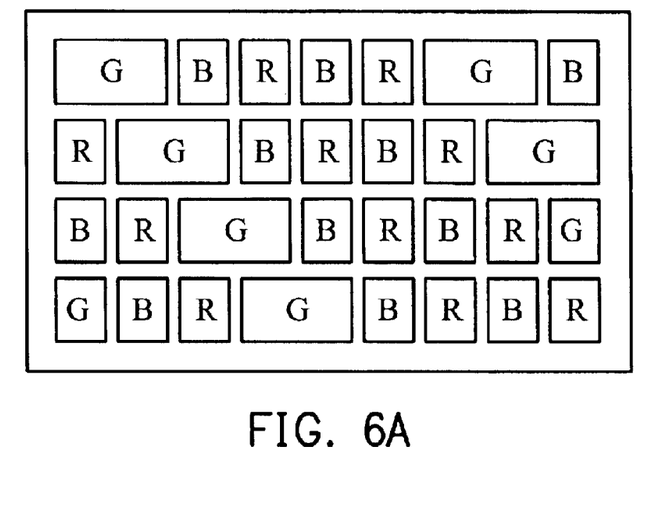
FIG. 6A is a plane view of a mosaic-type RGB arrangement according to the second embodiment of the present invention.
Figure 6B:
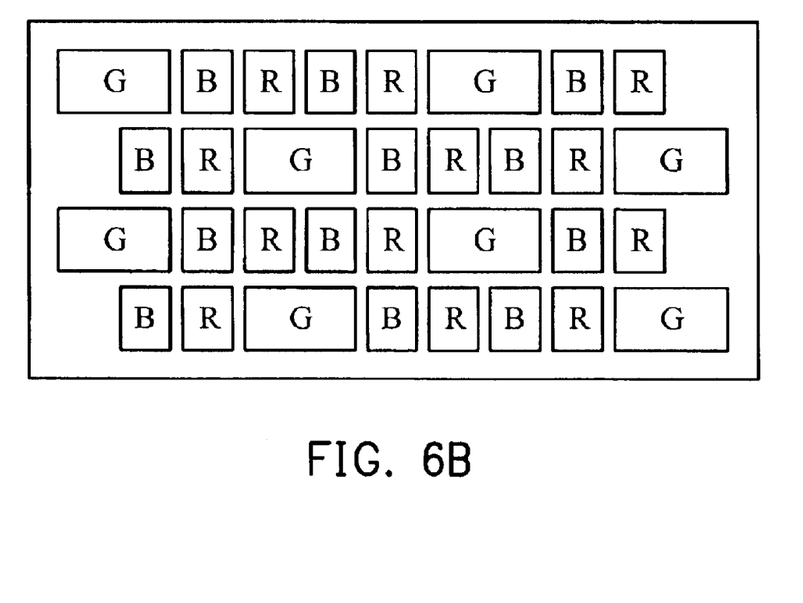
FIG. 6B is a plane view of a delta-type RGB arrangement according to the second embodiment of the present invention.

In FIG. 5D, in a strip-type RGB arrangement according to the above-described color elements 44, 46, 48, 46" and 48", the first color element 44 is preferably a green element G, the second color element 46 is preferably a blue element B, the third color element 48 is preferably a red element R, the fourth color element 46" is preferably a blue element B, and the fifth color element 48" is preferably a red element R. In addition, the green element G, the red element R and the blue element B according to the above-described color elements 44, 46, 48, 46" and 48" may be in a mosaic-type RGB arrangement as shown in FIG. 6A or a delta-type RGB arrangement as shown in FIG. 6B.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An arrangement of color elements for a color filter, comprising:
    a plurality of color element groups, in which each of the color element groups comprises a first color element, a second color element, a third color element and a fourth color element arranged in sequence;
    wherein, the first color element, the second color element, and the third color element comprise three colors;
    wherein, the second color element and the fourth color element are identical in color and width;
    wherein, an active width $W_1$ of the first color element and an active width $W_2$ of the second color element satisfy the formula: $W_1=A \times W_2$, A=1.7~2.3; and
    wherein, an active width $W_3$ of the third color element and the active width $W_2$ of the second color element satisfy the formula: $W_3=B \times W_2$, B=1.7~2.3.

2. The arrangement of color elements for a color filter of claim 1, wherein the first color element is a green element.

3. The arrangement of color elements for a color filter of claim 1, wherein each of the second color element and the fourth color element is a blue element.

4. The arrangement of color elements for a color filter of claim 1, wherein the third color element is a red element.

5. The arrangement of color elements for a color filter of claim 1, wherein the color element groups are in a strip-type RGB arrangement.

6. The arrangement of color elements for a color filter of claim 1, wherein the color element groups are in a mosaic-type RGB arrangement.

7. The arrangement of color elements for a color filter of claim 1, wherein the color element groups are in a delta-type RGB arrangement.

8. The arrangement of color elements for a color filter of claim 1, wherein the first color element comprises a left area and a right area delineated by a center line and the third color element comprises a left area and a right area delineated by a center line, thus the right area of the first color element, the second color element and the left area of the third color element form a first pixel.

9. The arrangement of color elements for a color filter of claim 8, wherein the left area of the first color element serves as a sub-pixel element of a second pixel left adjacent to the first pixel.

10. The arrangement of color elements for a color filter of claim 8, wherein the right area of the third color element and the fourth color element serve as two sub-pixel elements of a third pixel right adjacent to the first pixel.

11. An arrangement of color elements for a color filter, comprising:
    a plurality of color element groups, in which each of the color element groups comprises a first color element, a second color element, a third color element, a fourth color element and a fifth color element arranged in sequence;

wherein, the first color element, the second color element, and the third color element comprise three colors;

wherein, the second color element and the fourth color element are identical in color and width;

wherein, the third color element and the fifth color element are identical in color and width;

wherein, an active width $W_1$ of the first color element and an active width $W_2$ of the second color element satisfy the formula: $W_1 = A \times W_2$, $A = 1.7 \sim 2.3$; and wherein, the active width $W_1$ of the first color element and an active width $W_3$ of the third color element satisfy the formula: $W_1 = B \times W_3$, $B = 1.7 \sim 2.3$.

12. The arrangement of color elements for a color filter of claim 11, wherein the first color element is a green element.

13. The arrangement of color elements for a color filter of claim 11, wherein each of the second color element and the fourth color element is a blue element.

14. The arrangement of color elements for a color filter of claim 11, wherein each of the third color element and the fifth color element is a red element.

15. The arrangement of color elements for a color filter of claim 11, wherein the color element groups are in a strip-type RGB arrangement.

16. The arrangement of color elements for a color filter of claim 11, wherein the color element groups are in a mosaic-type RGB arrangement.

17. The arrangement of color elements for a color filter of claim 11, wherein the color element groups are in a delta-type RGB arrangement.

18. The arrangement of color elements for a color filter of claim 11, wherein the first color element comprises a left area and a right delineated by a center line, thus the right area of the first color element, the second color element, and the third color element form a first pixel.

19. The arrangement of color elements for a color filter of claim 18, wherein the left area of the first color element serves as a sub-pixel element of a second pixel left adjacent to the first pixel.

20. The arrangement of color elements for a color filter of claim 8, wherein the fourth color element and the fifth color element serve as two sub-pixel elements of a third pixel right adjacent to the first pixel.

* * * * *